W. B. LASHAR.
CHAIN TIRE GRIP.
APPLICATION FILED FEB. 29, 1912.
1,127,458.
Patented Feb. 9, 1915.
Fig. 1.
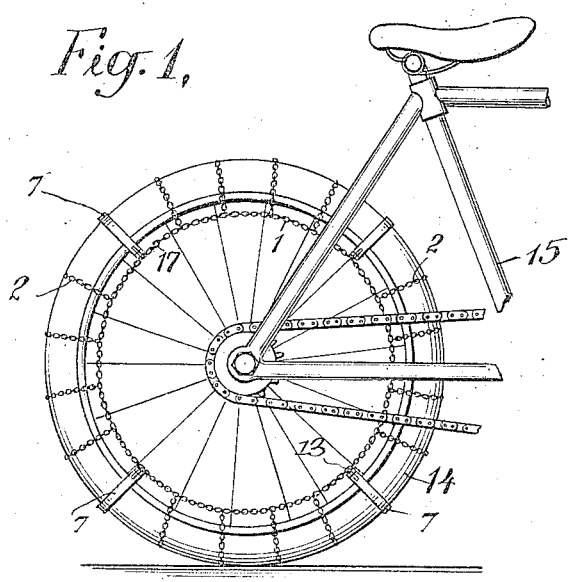
Fig. 2.
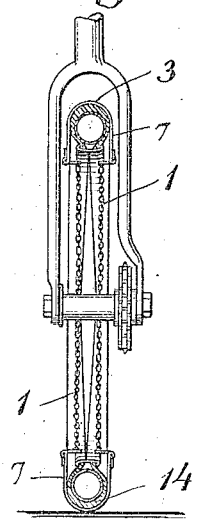
Fig. 3.
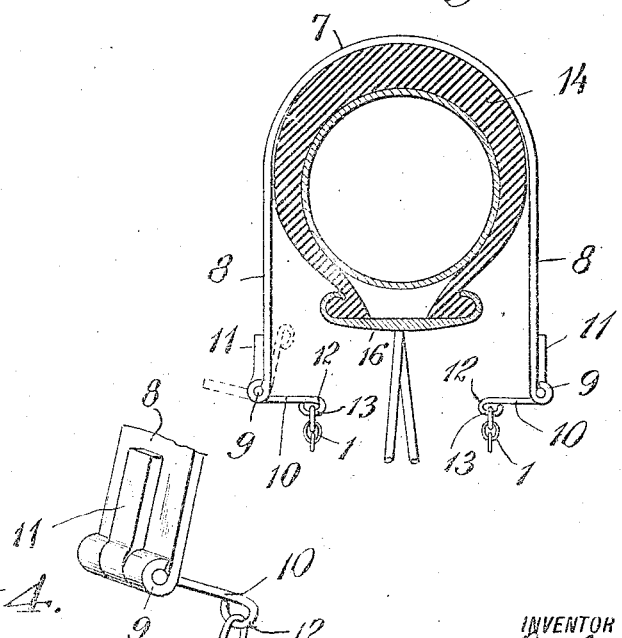
Fig. 4.
WITNESSES
Jessie B. Kay
Charles Eberhart
INVENTOR
Walter B. Lashar
BY
Duncan & Duncan ATTORNEYS

UNITED STATES PATENT OFFICE.

WALTER B. LASHAR, OF BRIDGEPORT, CONNECTICUT.

CHAIN TIRE-GRIP.

1,127,458.  Specification of Letters Patent.  Patented Feb. 9, 1915.

Application filed February 29, 1912. Serial No. 680,743.

*To all whom it may concern:*

Be it known that I, WALTER B. LASHAR, a citizen of the United States, and resident of Bridgeport, county of Fairfield, and State of Connecticut, have made a certain new and useful Invention Relating to Chain Tire-Grips, of which the following is a specification, taken in connection with the accompanying drawing, which forms part of the same.

This invention relates especially to chain tire grips adapted for use on motor cycles and the like and in which in addition to the usual side chains and tread chains extending around the tread surface of the tire a series of resilient retainers are connected to the side chains so as to hold them inward and prevent their objectionable contact with the frame or other parts of the vehicle.

In the accompanying drawings showing in a somewhat diagrammatic way illustrative embodiments of this invention, Figure 1 is a side view showing the device applied to a motor cycle wheel. Fig. 2 is a transverse section thereof. Fig. 3 is an enlarged sectional view of a tire section; and Fig. 4 is a perspective view showing a detail thereof.

The grip may comprise suitable side members of chain or other material and a series of suitable tread members preferably in the form of curb chain or other flexible material connected to the side members and adapted to extend around the tire so as to prevent slipping and give the desired increased traction while being sufficiently loose to creep around the wheel to such extent as to avoid objectionable localized wear on the tire. The side members may be in the form of side chains 1, the ends of which may be detachably connected by suitable connecting hooks or devices 17 of any desired character. These side members are preferably of such length as to be drawn in toward the wheel axle and away from the tread of the tire 14 so as to be preferably located farther in than the rim of the wheel when used on motor cycles, bicycles or the like. Any desired number of tread members may be connected to the side members and as indicated the tread members 2 may extend transversely around the tire tread and be directly connected to the side chains in any desired way. At a number of points around the wheel suitable preferably resilient retainers are connected to the side chains in place of or in addition to the regular tread members so as to bring the side members together and hold them inward sufficiently to prevent undesirable contact with the forks or other parts of the vehicle frame 15. These retainers may be in the form of resilient strips of steel or other suitable material about one-sixteenth or three thirty-seconds of an inch thick and half an inch or so wide for ordinary motor cycle use and as indicated in Figs. 2 and 3 these retainers 7 may be given a substantially U-form and be provided with swiveling holders or inwardly extending devices to be connected with the side chains. Such a form of retainer which is especially adapted for large tires is shown in Fig. 3 in which the resilient retainer 7 of tempered steel or other suitable material is provided with arms 8 arranged substantially parallel. Swiveling holders, such as 10, may be secured to the retainer arms in any desired way as by pivoting them thereto by the pivots 9 so that under service conditions the holders swing inward about their pivots until the connected detents 11 engage the retainer arms. The side chains or members may be connected to these holders in any desired way, as for instance by forming the integral tongues 12 on the holders and forcing them down upon the connectors 13 connected to the side chains 1. When this form of grip is removed from the wheel the swiveling holders may be forced upward into the position shown in dotted lines in Fig. 3 so that they may be readily drawn off from the tire or replaced thereon while in this closed position the mere tightening of the side chains swinging the holders inward into the operative position shown in full lines.

I claim:

1. The chain tire grip adapted for use on motor cycles or the like comprising side chains, tread chains connected to said side chains, a series of resilient retainers having substantially parallel arms each provided with a swiveling holder pivoted thereto and a detent on each holder to engage the corresponding retainer arm and maintain said holder in its inward operative position, said holders being connected to said side chains to hold the same inward under service conditions and prevent their undesirable contact with parts of the vehicle.

2. The tire grip comprising flexible chain side members, tread chains connected to said side members, a series of retainers having substantially parallel arms each provided with a movably connected holder, and a detent coöperating with each holder and retainer arm to normally maintain the holders on each retainer in their inward operative position approaching each other, said holders being connected to said side members to hold the same inward beyond the sides of the tire under service conditions and prevent undesirable contact with parts of the vehicle.

3. The tire grip comprising flexible side members, tread chains connected to said side members, a series of retainers having arms each provided with a movably connected holder, and a detent coöperating with each holder and retainer arm to normally maintain the holders on each retainer in their inward operative position approaching each other, said holders being connected to said side members to hold the same inward under service conditions and prevent undesirable contact with parts of the vehicle.

WALTER B. LASHAR.

Witnesses:
HARRY L. DUNCAN,
JESSIE B. KAY.